United States Patent
Park

(10) Patent No.: US 9,696,832 B2
(45) Date of Patent: Jul. 4, 2017

(54) TOUCH-WINDOW

(71) Applicant: LG INNOTEK CO., LTD., Seoul (KR)

(72) Inventor: Hoon Bae Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 100 days.

(21) Appl. No.: 14/607,475

(22) Filed: Jan. 28, 2015

(65) Prior Publication Data

US 2015/0138125 A1 May 21, 2015

Related U.S. Application Data

(63) Continuation of application No. 14/573,764, filed on Dec. 17, 2014, now Pat. No. 9,372,566, which is a continuation of application No. 14/347,984, filed as application No. PCT/KR2012/007772 on Sep. 26, 2012.

(30) Foreign Application Priority Data

Sep. 28, 2011 (KR) .................. 10-2011-0098188

(51) Int. Cl.
G06F 3/041 (2006.01)

(52) U.S. Cl.
CPC .... *G06F 3/041* (2013.01); *G06F 2203/04103* (2013.01)

(58) Field of Classification Search
CPC ................. G06F 3/041; G06F 2203/04103
See application file for complete search history.

(56) References Cited

U.S. PATENT DOCUMENTS

| | | |
|---|---|---|
| 2007/0025054 A1 | 2/2007 | Tonogai et al. |
| 2010/0045618 A1 | 2/2010 | Huang |
| 2010/0066683 A1 | 3/2010 | Chang et al. |
| 2010/0182254 A1 | 7/2010 | Lee et al. |
| 2010/0321305 A1 | 12/2010 | Chang et al. |
| 2011/0018836 A1 | 1/2011 | Yu |
| 2011/0050585 A1 | 3/2011 | Hotelling et al. |

(Continued)

FOREIGN PATENT DOCUMENTS

| | | |
|---|---|---|
| CN | 201449599 U | 5/2010 |
| CN | 201497975 U | 6/2010 |

(Continued)

OTHER PUBLICATIONS

International Search Report in International Application No. PCT/KR2012/007772, filed Sep. 26, 2012.

(Continued)

*Primary Examiner* — Adam R Giesy
(74) *Attorney, Agent, or Firm* — Saliwanchik, Lloyd & Eisenschenk

(57) ABSTRACT

Disclosed is the structure of a touch window. The touch window includes a transparent window, a touch sensor module on one surface of the transparent window, and a transfer film layer between the transparent window and the touch sensor module. The transfer film layer is provided in the touch sensor module to remove the structure of a printed pattern, so that the conventional problems related to the flatness caused by a printing step are solved, thereby improving the adhesive efficiency and expanding the realization range of various colors.

16 Claims, 3 Drawing Sheets

(56) References Cited

U.S. PATENT DOCUMENTS

| | | |
|---|---|---|
| 2011/0109590 A1 | 5/2011 | Park |
| 2011/0181545 A1 | 7/2011 | Takahashi et al. |
| 2011/0195240 A1 | 8/2011 | Inenaga |
| 2012/0007824 A1 | 1/2012 | Mi |
| 2012/0044590 A1 | 2/2012 | Alcazar |
| 2012/0094071 A1 | 4/2012 | Itoh et al. |
| 2012/0146922 A1 | 6/2012 | Kang et al. |
| 2016/0085349 A1 | 3/2016 | Oohira |

FOREIGN PATENT DOCUMENTS

| | | |
|---|---|---|
| CN | 201965582 U | 9/2011 |
| JP | 2001-15384 A | 1/2001 |
| KR | 10-0864407 B1 | 10/2008 |
| KR | 10-2010-0084262 A | 7/2010 |
| KR | 10-2010-0108123 A | 10/2010 |
| KR | 10-1031239 B1 | 4/2011 |
| KR | 10-2011-0103730 A | 9/2011 |
| TW | M351405 U | 2/2008 |
| TW | I313881 B | 8/2009 |
| TW | 201026811 A | 7/2010 |
| TW | M398654 U1 | 2/2011 |
| TW | 2011-08261 A | 3/2011 |

OTHER PUBLICATIONS

Office Action dated May 30, 2013 in Korean Application No. 10-2011-0098188.
Office Action dated Jul. 15, 2014 in Taiwanese Application No. 101135091.
Office Action dated May 11, 2016 in U.S. Appl. No. 14/347,984.
Office Action dated Jul. 6, 2015 in U.S. Appl. No. 14/573,764.
Office Action dated Mar. 2, 2016 in Chinese Application No. 201280058598.9.
Office Action dated Jan. 13, 2016 in Taiwanese Application No. 104104981.
Office Action dated Oct. 17, 2016 in U.S. Appl. No. 14/347,984.
Office Action dated Nov. 3, 2016 in Chinese Application No. 201280058598.9.
Office Action dated Apr. 5, 2017 in Chinese Application No. 201510050459.7.
Chinese Search Report dated Mar. 27, 2017 in Chinese Application No. 201510050459.7.

TOUCH-WINDOW

CROSS-REFERENCE TO RELATED APPLICATIONS

This application is a continuation of U.S. application Ser. No. 14/573,764, filed Dec. 17, 2014; which is a continuation of U.S. application Ser. No. 14/347,984, filed Mar. 27, 2014; which is the U.S. national stage application of International Patent Application No. PCT/KR2012/007772, filed Sep. 26, 2012; which claims priority to Korean Patent Application No. 10-2011-0098188, filed Sep. 28, 2011, which are hereby incorporated by reference in their entirety.

BACKGROUND

Technical Field

The disclosure relates to a printed pattern structure of a touch window.

Background of the Invention

A touch panel is installed on a display surface of an image display device such as a cathode ray tube (CRT), a liquid crystal display (LCD), a field emission display (FED), a plasma display panel (PDP), and an electro-luminescence device (ELD), so that a user inputs predetermined information into a computer by pressing the touch panel while viewing the image display device.

FIGS. 1 and 2 are views showing main components of a capacitive type touch panel. FIG. 1 is a plan view showing a multi-bonding structure, and FIG. 2 is a sectional view taken along a line X of FIG. 1. Referring to FIGS. 1 and 2, the touch panel generally includes a transparent window 10, an upper OCA 50 provided under the transparent window 10, an upper electrode layer (ITO) 40 provided under the upper OCA 50, a lower OCA 30, and a lower electrode layer 20. In addition, a liquid crystal panel 60 adheres to the bottom surface of the above structure. A touch screen panel TSP formed by bonding various layers to each other has a bonding area C which is formed by cutting the upper OCA 50, the upper electrode layer (ITO) 40, and the lower OCA 30 for the purpose of bonding to an FPCB module and exposes a connection pad P.

The above touch panel includes a printed pattern realized to represent various colors depending on the design of a terminal or hide internal wirings. Although the printed pattern is directly printed on the bottom surface of the transparent window 10, the thickness of the printed pattern degrades the adhesive strength with the upper OCA 50 provided under the transparent window 10, thereby causing the failure of the touch panel.

DETAILED DESCRIPTION

Technical Problem

Accordingly, the present invention has been made to solve the above-mentioned problems occurring in the prior art, and an object of the present invention is a touch window in which an IMD film or an IML film is provided in a touch sensor module to remove the structure of a printed pattern, so that the conventional problems related to the flatness caused by a printing step can be solved, thereby improving the adhesive efficiency and expanding the realization range of various colors.

Technical Solution

According to the embodiments, there is provided a touch window. The touch window includes a transparent window, a touch sensor module on one surface of the transparent window, and a transfer film layer between the transparent window and the touch sensor module.

In the touch window according to embodiments, the transfer film layer includes any one of an in mold decoration (IMD) film, an in mold lamination (IML) film, and an insert mold transcription (IMT) film.

Advantageous Effects

As described above, according to the disclosure, the IMD film or the IML film is provided in the touch sensor module to remove the structure of the printed pattern, so that the conventional problems related to the flatness caused by a printing step can be solved, thereby improving the adhesive efficiency and expanding the realization range of various colors.

MODE FOR INVENTION

Figure 1:
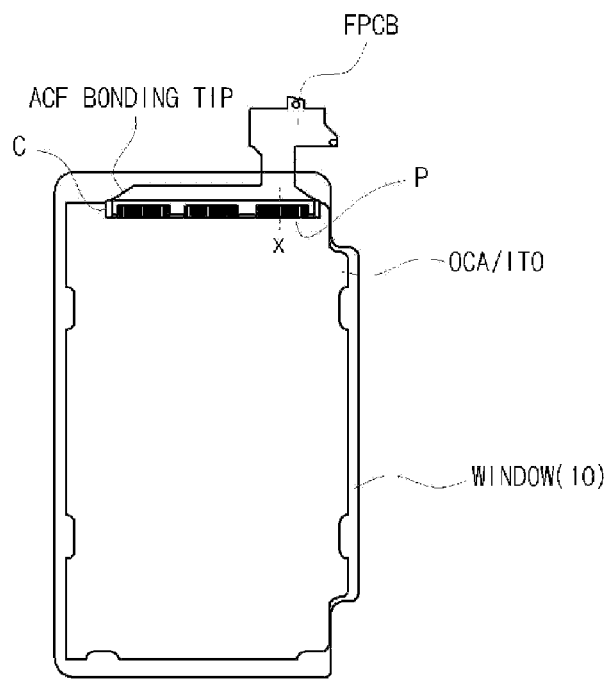
FIGS. 1 and 2 are views showing the structure of a touch panel according to the related art.
Figure 2:
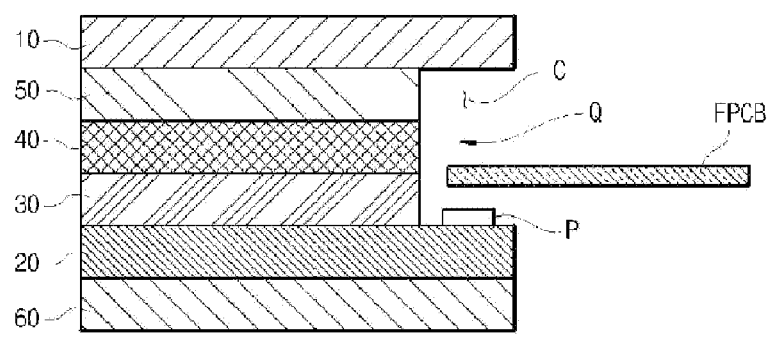

Hereinafter, the structure and the operation of the disclosure will be described in detail with reference to accompanying drawings. In the following description based on accompanying drawings, the same reference numeral represents the same component, and the repetition in the description will be omitted. The terms 'first' and 'second' are used for the purpose of explanation about various components, and the components should not be limited to the terms 'first' and 'second'. The terms 'first' and 'second' are only used to distinguish one component from another component.

Figure 3:
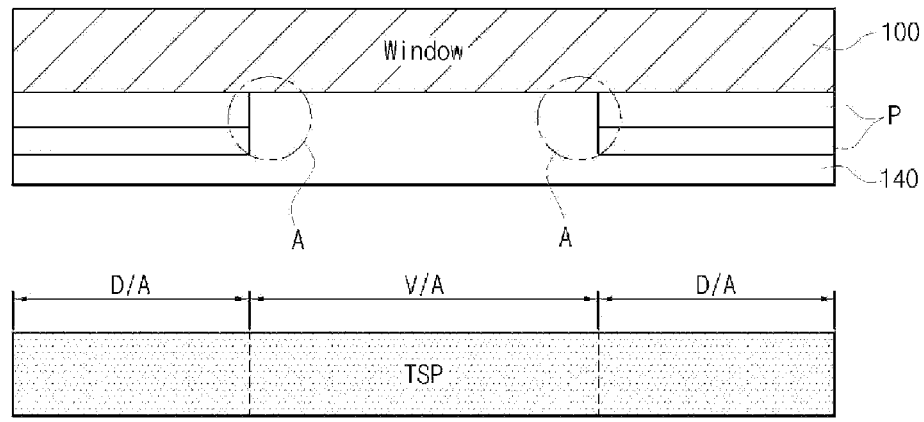
FIGS. 3 and 4 are schematic sectional views showing main components of a touch window according to the disclosure.
Figure 4:
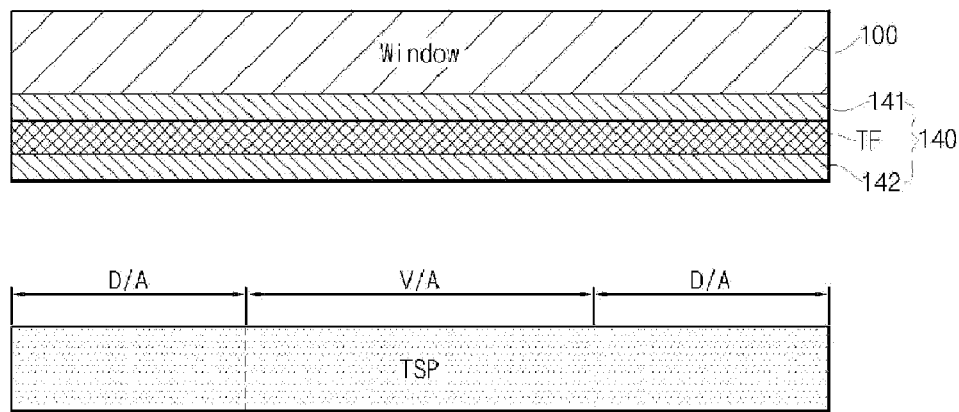

FIG. 3 is a schematic sectional view showing the structure of a touch window according to the related art, and FIG. 4 is a schematic sectional view showing the structure of the touch window according to the disclosure.

Referring to FIGS. 3 and 4, as shown in FIG. 3, a typical touch window may include a transparent window 100, a touch sensor module TSP bonded to one surface of the transparent window 100 through an adhesive material layer 140, and a printed pattern P formed on the transparent window 100 or the touch sensor module TSP. In other words, the touch window includes the transparent window 100 touching with the outside and the touch sensor module TSP provided under the transparent window 100 and divided into a view area V/A and dead areas D/A through a sensing electrode pattern layer.

In particular, the printed pattern P printed on the transparent window 100 is realized in the structure in which at least two layers are laminated. The printed pattern P may be provided in the dead area D/A of the touch sensor module TSP in order to realize a function of shielding a wiring pattern from being sighed from the outside and to represent the superior design effect of a product. In general, in order to realize the function of the printed pattern P, the printed pattern P is preferably formed in such a manner that a plurality of layers are overlapped with each other. When the printed pattern P is realized in the multi-structure, and when the touch sensor module TSP, the adhesive material layer 140, and the transparent window 100 are bonded to each other, an air layer A is formed between the adhesive material layer 140 and the printed pattern P due to the height (thickness) of the printed pattern, and such a space causes the bonding failure. In addition, the printed pattern P may not represent colors other than black or white due to the limitation in a printing technology.

In order to overcome the above limitation, as shown in FIG. 4, the touch window according to the disclosure includes the touch sensor module TSP bonded to one surface of the transparent window 100 through the adhesive material layer 140, and, particularly, a transfer film layer TF may be interposed between the transparent window 100 and the touch sensor module TSP.

In this case, the transfer film layer TF may include any one of an in-mold decoration film (IMD) film, an in-mold lamination (IML) film, or an insert mold transcription (IMT) film. Each film layer is realized by forming a thin film on a film including PET, PC, or PMMA, performing a printing process, and inserting a film therein while injection-molding the resultant structure.

In this case, the IMD film can be obtained by inserting a film, which is transparently printed and deposited through a gravure printing scheme, into an injection mold or an extrusion mold and then transferring a pattern printed on the film to a resin surface. The IML film can be obtained by inserting a film, which is transparently printed and deposited through a gravure printing scheme, into an injection mold or an extrusion mold and then bonding a pattern printed on the film to a resin surface. Different from a conventional IML scheme, the IMT film obtained through an insert mold transcription (IMT) scheme can be formed by inserting a mold through a vacuum suction scheme, after forming a base layer, without a forming process or a cutting process to form a pattern on a resin, and then releasing a film.

Hereinafter, the structure of a typical IMD film will be described for the illustrative purpose. The IMD film may include a base layer, a release layer covered on the base layer, and a printed layer covered on the release layer. An adhesion layer OCA may be provided on the top surface of the printed layer. In this case, a color ink layer is additionally interposed between the printed layer and the adhesion layer OCA to represent various colors. The release layer is separated after the printed layer has been bonded with the resin.

In this case, the base layer may include a sheet made of polyester (PET), methyl methacrylate (PMMA), polycarbonate (PC), acrylonitrile butadiene styrene (ABS), polystyrene (PS), any other transparent inorganic chemical compounds, any other transparent organic chemical compounds, or any transparent paper. The release layer may include a sheet made of transparent (or color) hydrophilic inorganic (or organic) chemical compounds. The printed layer may include a sheet made of transparent resin, a fluorescence inorganic material, a fluorescence organic material. The release layer may be interposed between the base layer and the printed layer. The printed layer is covered on the release layer through a printing scheme.

In other words, in the structure shown in FIG. 4, after the IMD film has been laminated on the touch sensor module TSP, the transparent window 100 is bonded to the resultant structure. According to the technology employed for the structure of FIG. 3, when the transparent window 100 is bonded to the touch sensor module TSP, a bonding failure occurs because the irregular surface is formed without maintaining the surface flatness due to the printing step formed on the surface of the transparent window 100. In contrast, when the IMD film is applied as shown in the structure of FIG. 4, since the printing step is not formed, the surface flatness is easily maintained, so that an adhesive property can be improved. In other words, according to the technology of the disclosure, the printed pattern P is substituted with a transfer film layer TF such as the IMD film, so that the printing step is not formed, and various colors of the transfer film layer TF can be realized.

Hereinafter, the structure of the touch sensor module TSP to which the transfer film layer TF according to the disclosure is applied will be described in brief. The touch sensor module TSP to be formed under the transparent window 100 from the above structure may have the structure shown in FIG. 5.

In other words, the touch sensor module TSP according to the disclosure has a structure including base substrates 130 and 110 and sensing electrodes 132 and 112 patterned on one surfaces of the base substrates 130 and 110 or on opposite surfaces to the one surfaces of the base substrates 130 and 110. In other words, first adhesive material layers 141 and 142 are provided on the transparent window 100, so that the transfer film layer TF makes contact with the touch sensor module TSP provided under the transfer film layer TF. The touch sensor module TSP may include a first sensing electrode pattern layer provided on one surface thereof with the first sensing electrode pattern 132, and a second sensing electrode pattern layer adhering to an opposite surface of the first sensing electrode pattern layer through the second adhesive material layer 120 and provided on one surface thereof with the second sensing electrode pattern 112. In particular, the first and second sensing electrode patterns 132 and 112 may be formed on the first and second base substrates 130 and 110, respectively, while being spaced apart from each other. In addition, wiring patterns 131 and 111 are connected to the first and second sensing electrode patterns 132 and 112, respectively.

Each adhesive material layer may include an OCA film, and the first and second sensing electrode patterns may include one of indium tin oxide (ITO), indium zinc oxide (IZO), and zinc oxide (ZnO).

Figure 5:
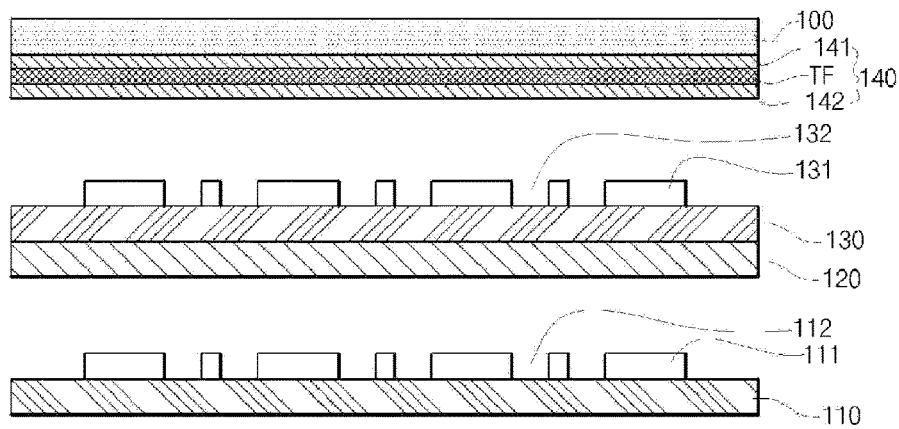
FIGS. 5 to 7 are sectional views showing a touch sensor module according to various embodiments of the disclosure.
Figure 6:
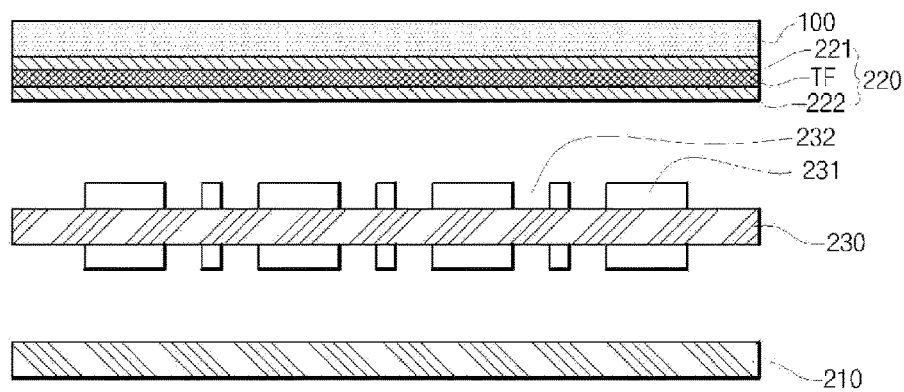

In addition, different from the structure of FIG. 5, the transfer film layer TF is bonded to the touch sensor module TSP by using the adhesive material layers 221 and 222 under the transparent window 200 as shown in FIG. 6. In this case, the touch sensor module TSP may be realized in the structure including a base substrate 230 bonded to one surface of the transparent window 200 by using an adhesive material layer 222, and first and second sensing electrode patterns 232 patterned on one surface of the base substrate 230 and the opposite surface provided to the one surface of the base substrate 230. In addition, the touch window may further include a protective film 210 to protect the second sensing electrode pattern provided on the bottom surface of the base substrate 230.

Figure 7:
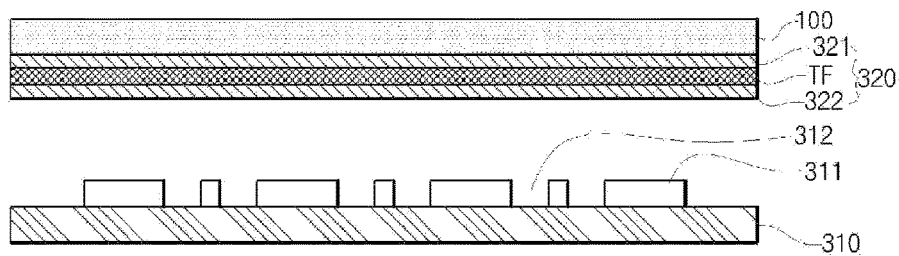

In addition, as shown in FIG. 7, a transparent window 300 is formed, a sensing electrode pattern 312 is patterned on the sectional surface of the base substrate 310, and a wiring part 311 may be formed together with the sensing electrode pattern 312. In this case, as described above, the transfer film layer TF according to the disclosure is bonded to one surface of the transparent window 300 by using adhesive material layers 321 and 322.

Since the first and second sensing electrode patterns 312 are realized on the same plane, the first sensing electrode pattern 312 is patterned to determine a first axial component (e.g., X-axial component) of a touch, and the second sensing electrode pattern 312 for determining a second axial component (e.g., Y-axial component) of the touch is patterned while being insulated from the first sensing electrode pattern 312. In addition, when the first and second sensing electrode patterns 312 are formed on the bottom surface of the base substrate 310, the touch window may further include a protective film (not shown) formed on the bottom surface of the base substrate 310 to protect the first and second sensing electrode patterns 312.

Although FIG. 7 shows that the first and second sensing electrode patterns are formed on the same plane of the additional base substrate 310, the first and second sensing electrode patterns may be directly formed on one surface of the transparent window 300 through a deposition process or a coating process without the base substrate 310. In addition, the touch window may further include a protective film (not shown) formed on one surface of the transparent window 300 to protect the first and second sensing electrode patterns.

The touch window according to the disclosure may be attached to various display devices. In other words, the display device may include an organic light emitting device or a plasma display panel other than a liquid crystal display. In this case, to prevent a touch sensing panel from erroneously operating as the noise component generated due to the driving of the display device is transferred to a touch sensor module, that is, a touch screen panel (TSP), a shield layer may be selectively provided between the touch sensing panel and the display device.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A touch window comprising:
   a transparent window;
   a base layer disposed under the transparent window;
   a printed layer disposed on the base layer;
   a touch sensor module disposed on the base layer and including a view area and a dead area; and
   a first adhesive layer disposed between the transparent window and the base layer,
   wherein the touch window is configured such that the view area of the touch sensor module is visible through the transparent window and the dead area of the touch sensor module is concealed from the transparent window,
   wherein the base layer is in direct physical contact with the first adhesive layer;
   wherein the first adhesive layer includes:
   a first area corresponding to the view area of the touch sensor module; and
   a second area corresponding to the dead area of the touch sensor module,
   wherein the first area of the first adhesive layer is in direct physical contact with the base layer,
   wherein the second area of the first adhesive layer is in direct physical contact with the base layer, and
   wherein the first and second areas of the first adhesive layer contact a same plane of the base layer.

2. The touch window of claim 1, wherein a first surface of the base layer is in direct physical contact with the first adhesive layer, and
   wherein a second surface of the base layer, opposite to the first surface, is in direct physical contact with the printed layer.

3. The touch window of claim 1, wherein a thickness of the first adhesive layer in the first area is the same as that of the first adhesive layer in the second area.

4. The touch window of claim 1, wherein the base layer is transparent.

5. The touch window of claim 4, wherein the base layer includes polyethylene terephthalate (PET), polymethyl methacrylate (PMMA), polycarbonate (PC), acrylonitrile butadiene styrene (ABS), or polystyrene (PS).

6. The touch window of claim 1, wherein the printed layer corresponds to the dead area of the touch sensor module.

7. The touch window of claim 1, wherein the first adhesive layer includes an optically-clear adhesive (OCA).

8. The touch window of claim 1, wherein the touch sensor module comprises:
   a first substrate on the first adhesive layer;
   a first sensing electrode on the first substrate;
   a second substrate on the first substrate; and
   a second sensing electrode on the second substrate.

9. The touch window of claim 1, wherein the touch sensor module comprises:
   a substrate on the first adhesive layer;
   a first sensing electrode on one surface of the substrate; and
   a second sensing electrode on an opposite surface of the substrate.

10. The touch window of claim 1, wherein the touch sensor module comprises:
    a substrate on the first adhesive layer;
    a first sensing electrode on a first surface of the substrate; and
    a second sensing electrode on the first surface of the substrate,
    wherein the first sensing electrode and the second sensing electrode are on a same plane of the first surface of the substrate.

11. The touch window of claim 1, further comprising a second adhesive layer, wherein the base layer and the printed layer are disposed between the first adhesive layer and the second adhesive layer.

12. The touch window of claim 11, wherein the base layer is in direct physical contact with the second adhesive layer.

13. A touch window comprising:
    a transparent window;
    a first adhesive layer under the transparent window;
    a transfer film under the first adhesive layer;
    a second adhesive layer under the transfer film; and
    a touch sensor module disposed under the second adhesive layer and including a view area and a dead area;
    wherein the transfer film is in direct physical contact with the first adhesive layer and the second adhesive layer,
    wherein the touch window is configured such that the view area of the touch sensor module is visible through the transparent window and the dead area of the touch sensor module is concealed from the transparent window,
    wherein the second adhesive layer includes:
    a first area corresponding to the view area of the touch sensor module; and
    a second area corresponding to the dead area of touch sensor module, and
    wherein a thickness of the second adhesive layer in the first area is the same as that of the second adhesive layer in the second area.

14. The touch window of claim 13, wherein the transfer film comprises a base layer and a printed layer.

15. The touch window of claim 13, wherein the first adhesive layer includes:
- a first area corresponding to the view area of the touch sensor module; and
- a second area corresponding to the dead area of the touch sensor module,
- wherein a thickness of the first adhesive layer in the first area is the same as that of the first adhesive layer in the second area.

16. The touch window of claim 13, wherein the first adhesive layer comprises an optically-clear adhesive (OCA), and wherein the second adhesive layer comprises an optically-clear adhesive (OCA).

* * * * *